United States Patent
Glover

(10) Patent No.: US 7,132,960 B2
(45) Date of Patent: *Nov. 7, 2006

(54) APPROACH MONITORING AND ADVISORY SYSTEM AND METHOD

(75) Inventor: John H. Glover, Bellevue, WA (US)

(73) Assignee: Honeywell International Inc., Morristown, NJ (US)

( * ) Notice: Subject to any disclaimer, the term of this patent is extended or adjusted under 35 U.S.C. 154(b) by 391 days.

This patent is subject to a terminal disclaimer.

(21) Appl. No.: 10/680,686

(22) Filed: Oct. 7, 2003

(65) Prior Publication Data

US 2004/0075586 A1 Apr. 22, 2004

Related U.S. Application Data

(60) Provisional application No. 60/418,906, filed on Oct. 15, 2002.

(51) Int. Cl.
*G08B 21/00* (2006.01)
*B64C 1/00* (2006.01)

(52) U.S. Cl. ............... 340/945; 340/973; 340/972; 340/979; 701/8; 701/9

(58) Field of Classification Search ............. 340/945, 340/972
See application file for complete search history.

(56) References Cited

U.S. PATENT DOCUMENTS

| | | | |
|---|---|---|---|
| 3,496,769 A | 2/1970 | Vietor | 73/178 T |
| 4,319,219 A | 3/1982 | Rein-Weston | 340/968 |
| 4,536,843 A | 8/1985 | Lambregts | 701/3 |
| 4,750,127 A | 6/1988 | Leslie et al. | 701/16 |
| 5,260,702 A | 11/1993 | Thompson | 340/970 |
| 6,317,690 B1 | 11/2001 | Gia | 701/301 |
| 2001/0052562 A1* | 12/2001 | Ishihara et al. | 244/175 |

* cited by examiner

*Primary Examiner*—Donnie L. Crosland
(74) *Attorney, Agent, or Firm*—Black Lowe & Graham PLLC

(57) ABSTRACT

A system, method, and computer program product are provided for monitoring for high energy landing approaches and advising a flight crew of an aircraft. Specific aircraft energy is predicted at a touchdown zone of a runway. The predicted specific energy is compared with predetermined threshold specific energy. An alert is generated when the predicted specific energy is at least the predetermined threshold specific energy. The present invention improves flight crew awareness of an impending problem with a landing approach, such as a high energy approach, provides an advisory when probability of an unsuccessful approach is significant, and allows a margin from stable approach criteria while avoiding increased aural and visual clutter in the flight deck.

57 Claims, 6 Drawing Sheets

APPROACH MONITORING AND ADVISORY SYSTEM AND METHOD

PRIORITY CLAIM

This patent application claims priority from U.S. Provisional Patent Application Ser. No. 60/418,906 filed Oct. 15, 2002, and entitled "Approach Monitoring and Advisory System," the entire contents of which are hereby incorporated by reference.

FIELD OF THE INVENTION

This invention relates generally to hazard alert systems for aircraft and, more specifically, to cockpit landing aids.

BACKGROUND OF THE INVENTION

Landing an aircraft is the most demanding task in flying. During the landing process, the aircraft must transition from operating in three dimensions of motion to operating in only two dimensions of motion and must be brought to a safe and complete stop. To perform the landing properly, the aircraft must approach the runway within certain attitude, track, speed, and rate of descent limits. An approach outside of these limits can result in the aircraft making a "hard" landing, overrunning the runway end, or otherwise contacting the runway surface in an uncontrolled manner. Any one of these events has the potential to cause severe damage to the aircraft and may additionally result in passenger injuries or fatalities.

In the past, a "too-low" approach was the most hazardous type of approach. However, the Ground Proximity Warning System/Enhanced Ground Proximity Warning System (GPWS/EGPWS) developed by Honeywell International, Inc. has reduced this risk significantly.

A "high energy" approach is now the highest risk, and a significant number of aircraft accidents and incidents are caused by high energy approaches. A high energy approach is an approach that is too fast and/or too high—that is, speed and/or altitude during the landing approach is excessive. The result of these "high energy" landing approaches may be a hard landing, over-running the runway, or departing the runway. For example, for each knot of airspeed in excess of a reference airspeed (unique to that aircraft and landing configuration on landing approach), the aircraft rollout distance may increase by approximately two percent. As a further example, aircraft approaching the runway at too steep an angle (that is, in excess of a nominal glidepath of around three degrees or so) have an excess amount of energy that must be dissipated during landing flare and touchdown. This condition not only places the aircraft at risk for undercarriage damage, but also may result in the aircraft floating down the runway during the flare in order to bleed off the excess energy. The runway distance consumed during the float is no longer available to stop the aircraft after touchdown and a runway overrun condition is possible.

Nonetheless, many successful landing approaches are made outside defined "stable approach" criteria. For example, successful approaches are made when air traffic control requirements cause conditions, such as a late turn to final approach or a late descent. Further, schedule pressure may cause conditions outside stable approach criteria, such as excessive airspeed.

As a result, it would be desirable to improve flight crew awareness of an impending problem with an approach—such as a high energy approach; to provide an advisory when probability of an unsuccessful approach is significant; to allow a margin from stable approach criteria; and to avoid increasing aural and visual clutter in the flight deck. However, there is an unmet need in the art for a system and method for monitoring and advising a flight crew of high energy landing approaches.

SUMMARY OF THE INVENTION

Embodiments of the present invention provide a system, method, and computer program product for monitoring for high energy landing approaches and advising a flight crew of an aircraft. Advantageously, the present invention improves flight crew awareness of an impending problem with a landing approach, such as a high energy approach. The present invention provides an advisory when probability of an unsuccessful approach is significant and allows a margin from stable approach criteria while avoiding increased aural and visual clutter in the flight deck.

According to an exemplary embodiment of the present invention, specific aircraft energy is predicted at a touchdown zone of a runway. The predicted specific energy is compared with predetermined threshold specific energy. An alert is generated when the predicted specific energy is at least the predetermined threshold specific energy.

According to an aspect of the present invention, the specific energy may include specific potential energy, specific kinetic energy, and specific total energy.

The alert may include a message that is indicative of an aircraft altitude that is higher than a predetermined glide slope when the predicted specific potential energy is at least the predetermined threshold specific potential energy. Also, the alert may include a message that is indicative of an aircraft speed that is faster than a predetermined ground speed when the predicted specific kinetic energy is at least the predetermined threshold specific kinetic energy. Further, the alert may include a message that is indicative of an aircraft altitude that is higher than the predetermined glide slope and an aircraft speed that is faster than the predetermined ground speed when the predicted specific total kinetic energy is at least the predetermined threshold specific total energy.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
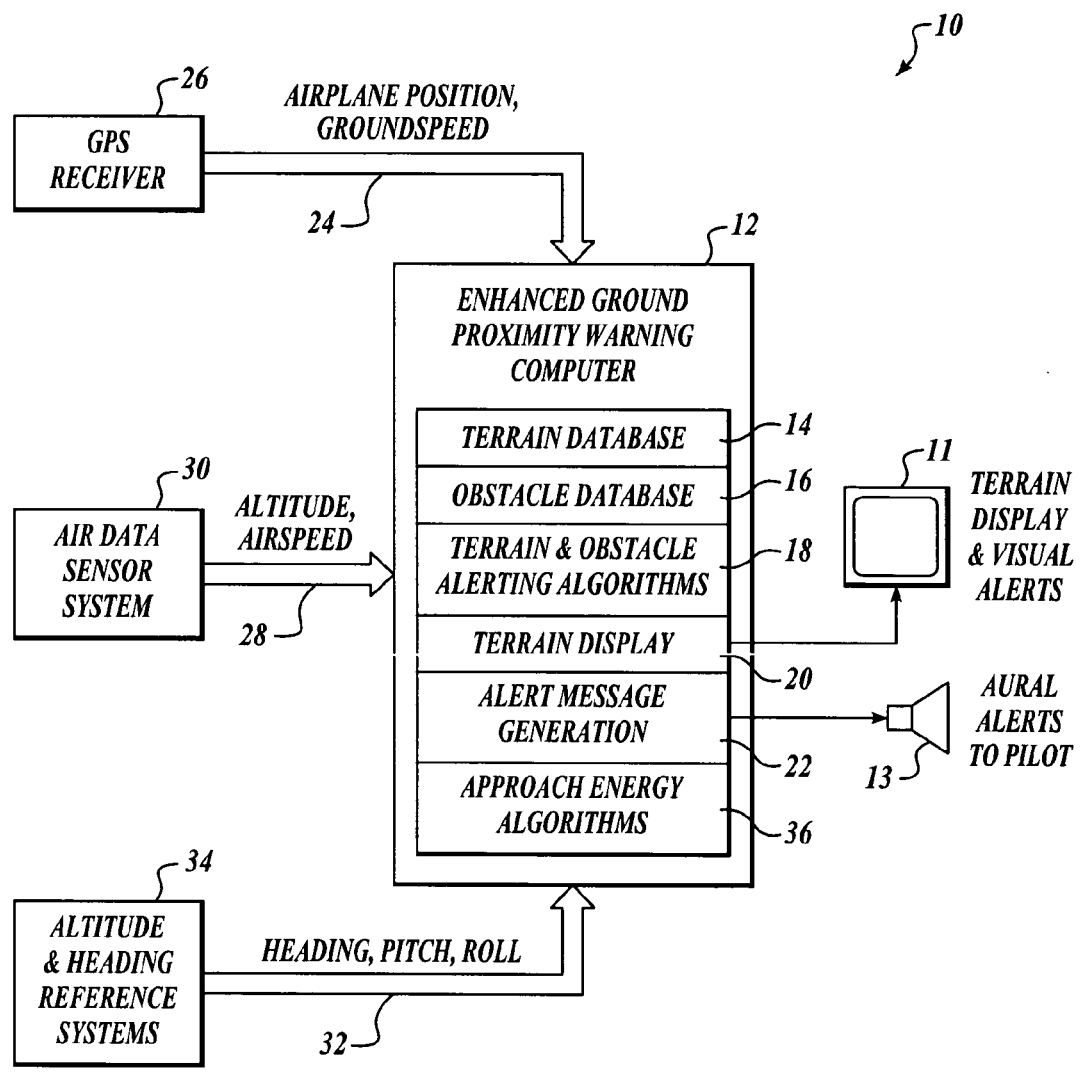
FIG. 1 is a block diagram of an exemplary system according to an embodiment of the present invention.

By way of overview and referring to FIG. 1, an exemplary system 10 according to an embodiment of the present invention alerts a flight crew of an aircraft (not shown) of a potentially hazardous condition, such as an impending high energy landing. Embodiments of the present invention provide an advisory when probability of an unsuccessful approach is significant and allows a margin from stable approach criteria while avoiding increased aural and visual clutter in a flight deck (not shown) of the aircraft. According to an exemplary embodiment of the present invention, specific aircraft energy is predicted at a touchdown zone of a runway (not shown). The predicted specific energy is compared with predetermined threshold specific energy. The specific energy may include specific potential energy, specific kinetic energy, and specific total energy. An alert is generated and provided to the flight crew via a display device 11 and/or an aural alerting device 13 when the predicted specific energy is at least the predetermined threshold specific energy. Details of an exemplary embodiment of the present invention will be set forth below.

A processor 12 is configured to predict specific energy of the aircraft at the touchdown zone of the runway. The processor 12 suitably is any microprocessor, firmware, executable code, general purpose processor, existing aircraft subsystem having a general purpose processor, flight computer known in the art that is capable of performing mathematical calculations, or any combination thereof. Examples of existing aircraft subsystems having a general purpose processor include without limitation a Traffic Collision and Avoidance System (TCAS) and a Flight Management System (FMS).

In a presently preferred embodiment, the processor 12 is an Enhanced Ground Proximity Warning System (EGPWS) Computer, available from Honeywell International, Inc. Advantageously, use of an EGPWS computer provides within the processor 12 a terrain database 14 (including natural and/or man-made terrain features such as geographic data and/or runway data), an obstacle database 16, terrain and obstacle alerting algorithms 18, a terrain display driver 20, and an alert message generator 22. The terrain database 14 may be useful for determining runway heading, available runway length, runway slope, and nominal glide slope angle. The obstacle database 16 may be useful for identifying any obstacles along an approach course and runway ends.

The processor 12 receives various inputs useful for predicting components of specific energy of the aircraft (described in detail below). In one exemplary embodiment of the present invention, the processor 12 receives position and groundspeed signals 24 from a Global Positioning System (GPS) receiver 26. The processor 12 also receives altitude and airspeed signals 28 from any acceptable air data sensor system 30. Finally, the processor 12 receives heading, pitch, and roll signals 32 from any acceptable altitude and heading reference system 34.

Advantageously, according to the present invention, the processor 12 includes approach energy algorithms 36 that predict specific energy of the aircraft during a landing approach. Exemplary calculations that implement the approach energy algorithms will be discussed below, followed by a discussion of an exemplary logic implementation of the approach energy algorithms 36.

The approach energy algorithms 36 predict specific energy of the aircraft at touchdown as follows. As is known, total energy $E_0$ is the sum of potential energy $E_P$ and kinetic energy $E_K$. For an aircraft, total energy $E_0$ may be given as $$E_0 = E_P + E_K = mgh_{AT} + \frac{1}{2}mV_G^2 \quad (1)$$

where
m=mass of the aircraft;
g=acceleration due to gravity;
$h_{AT}$=height of the aircraft above the touchdown zone of the runway; and
$V_G$=groundspeed of the aircraft.

Total specific energy $e_0$ is therefore a sum of specific potential energy $e_P$ and specific potential energy $e_K$, and may be given as $$e_0 = e_P + e_K = \frac{E_0}{mg} = h_{AT} + \frac{V_G^2}{2g} \quad (2)$$

Predicting a predicted total specific energy $e_E$ at the touchdown zone entails adding to the total specific energy $e_0$ a differential total specific energy predicted to arise during the landing approach:

$$e_E = e_0 + \left(\frac{de}{dt}\right) \cdot \Delta T_{TDZ} \quad (3)$$

where
$e_E$=predicted specific total energy;

$$\frac{de}{dt} = \text{rate of change of specific energy;}$$

and
$\Delta T_{TDZ}$=estimated time to touchdown.
The rate of change of specific energy $$\frac{de}{dt}$$

is given as $$\frac{de}{dt} = \dot{h} + \frac{V_G \dot{V}_G}{g} \quad (4)$$

where
$\dot{h}$=rate of change of height; and
$\dot{V}_G$=rate of change of groundspeed; and
the estimated time to touchdown $\Delta T_{TDZ}$ is given as $$\Delta T_{TDZ} = \frac{D_{TDZ}}{\overline{V}_G} \quad (5)$$

where
$D_{TDZ}$=distance to touchdown; and
$\overline{V}_G$=average groundspeed.

It will be appreciated that a target, or threshold, specific potential energy at the touchdown zone $e_{TP,TDZ}$ is zero, because the height above the touchdown zone $h_{AT}$ is zero. A target, or threshold, specific kinetic energy at the touchdown zone $e_{TK,TDZ}$ is given by $$e_{TK_{TDZ}} = \frac{V_{G.Ref}^2}{2g} \qquad (6)$$

where $V_{G.Ref} = V_{T.Ref} - V_{Headwind}$ = desired reference ground speed; and $V_{T.Ref}$ is Vref (reference or desired approach indicated airspeed) converted to true airspeed.

According to an embodiment of the present invention, predicted excess specific total energy $\Delta e_{T,TDZ}$ is predicted as follows:

$$\Delta e_{T_{TDZ}} = \Delta e_{P_{TDZ}} + \Delta e_{K_{TDZ}} \qquad (7)$$

where $\Delta e_{P_{TDZ}}$ = predicted excess specific potential energy; and
$\Delta e_{K_{TDZ}}$ = predicted excess specific kinetic energy.

Predicted excess specific potential energy $\Delta e_{P_{TDZ}}$ is predicted as follows:

$$\Delta e_{P_{TDZ}} = h_{AT} + \frac{\dot{h}.D_{TDZ}}{V_G} = h_{AT} + \gamma \cdot D_{TDZ} \qquad (8)$$

where

γ=flight path angle.

Thus, the predicted excess specific potential energy $\Delta e_{P_{TDZ}}$ is the amount of specific potential energy above what the aircraft would have if the aircraft arrived at the runway on a nominal flight path angle γ.

Predicted excess specific kinetic energy $\Delta e_{K_{TDZ}}$ is predicted as follows:

$$\Delta e_{K_{TDZ}} = \frac{1}{2g}(V_G^2 - V_{G.Ref}^2 + 2D_{TDZ}\dot{V}_G) \qquad (9)$$

Thus, the predicted execess specific kinetic energy $\Delta e_{K_{TDZ}}$ is the amount of specific kinetic energy above what the aircraft would have if the aircraft arrived at the runway with a ground speed of $V_{GRef}$. As a result, according to an embodiment of the present invention the predicted excess specific total energy $\Delta e_{T,TDZ}$, the predicted excess specific potential energy $\Delta e_{P_{TDZ}}$, and the predicted execess specific kinetic energy $\Delta e_{K_{TDZ}}$ are the quantities of specific energy that are compared to alert thresholds to determine if an alert is to be generated.

It will be appreciated that the predicted excess specific potential energy $\Delta e_{P_{TDZ}}$ and the predicted execess specific kinetic energy $\Delta e_{K_{TDZ}}$ are "predicted" because they are estimated based upon what will happen at the runway based on the present state (that is, speed and altitude) and based upon rate of change of state (that is, $\dot{V}_G$ and γ).

Figure 2:
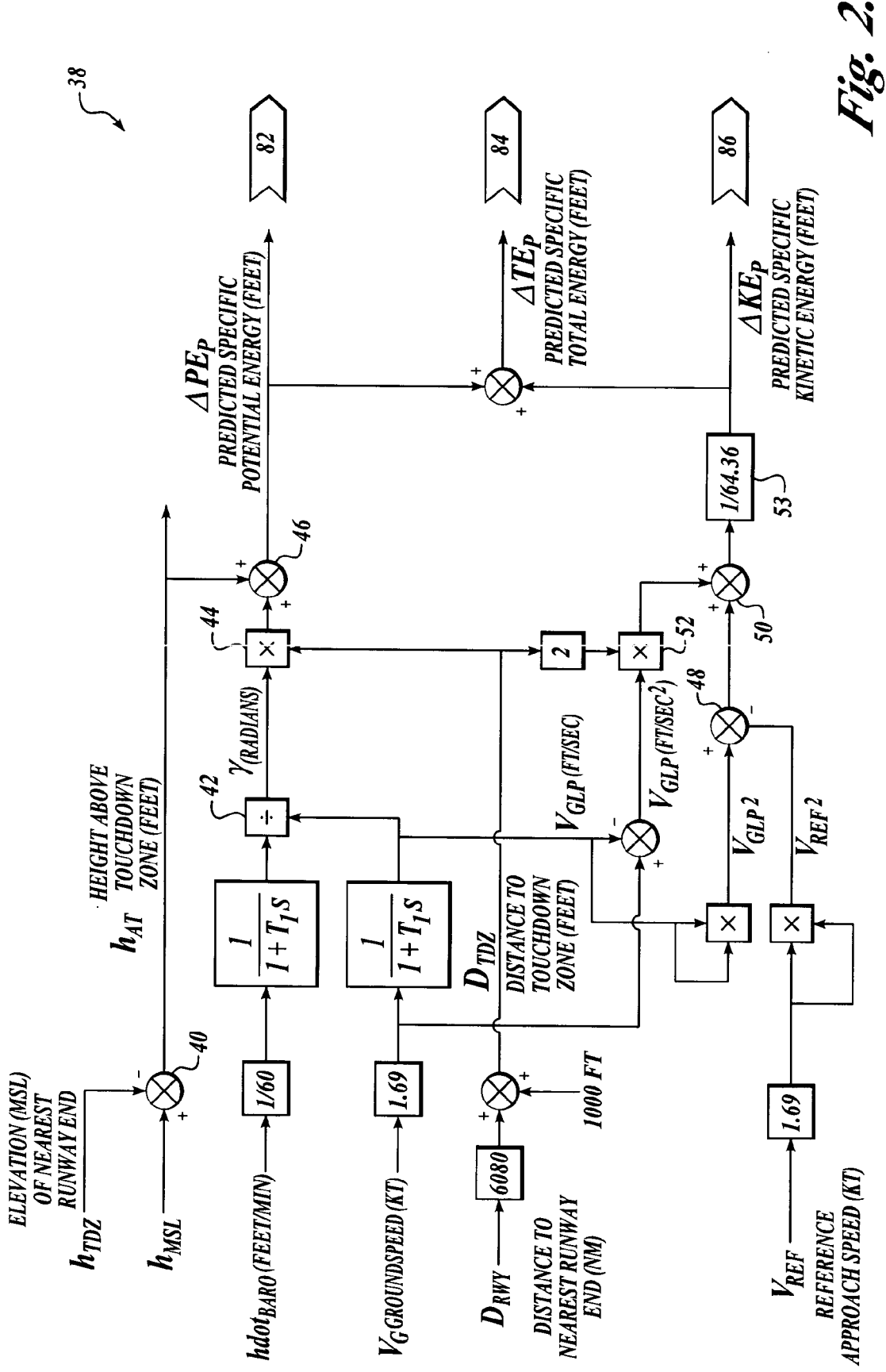
FIG. 2 is a detailed block diagram of a portion of the system of FIG. 1.

Referring now to FIGS. 1 and 2, exemplary logic 38 determines the predicted excess specific potential energy $\Delta e_{P_{TDZ}}$, the predicted excess specific kinetic energy $\Delta e_{K_{TDZ}}$, and the predicted excess specific total energy $\Delta e_{T,TDZ}$.

The predicted excess specific potential energy $\Delta e_{K_{TDZ}}$ is determined as follows. Height above mean sea level $h_{MSL}$ is applied to an input of a summing junction 40 and elevation above mean sea level of the nearest runway end $h_{TDZ}$ is applied to an inverting input of the junction 40. The height above the touchdown zone $h_{AT}$ is calculated by subtracting the elevation above mean sea level of the nearest runway end $h_{TDZ}$ from the height above mean sea level $h_{MSL}$. The rate of change of height ḣ is divided by the groundspeed $V_G$ at a block 42, thereby yielding the flight path angle γ. The flight path angle γ is in turn multiplied by the distance to the touchdown zone $D_{TDZ}$ at a block 44. This is added to the height above the touchdown zone $h_{AT}$ by a summing junction 46. This yields the predicted excess specific potential energy $\Delta e_{K_{TDZ}}$ as set forth in Equation (8).

The predicted excess specific kinetic energy $\Delta e_{K_{TDZ}}$ is determined as follows. The square of the groundspeed $V_G^2$ is provided to an input of a summing junction and the square of the reference approach speed $V_{G.Ref}^2$ is provided to an inverting input of the junction 48. The junction 48 thus subtracts the square of the reference approach speed $V_{G.Ref}^2$ from the square of the groundspeed $V_G^2$. This difference is provided to an input of a summing junction 50. The rate of change of groundspeed $\dot{V}_G$ is multiplied by twice the distance to the touchdown zone $D_{TDZ}$ at a block 52. The product from the block 52 is provided to another input of the junction 50 and added to the difference from the junction 48. The sum from the block 50 is divided by twice the acceleration due to gravity (that is, 2 g) at a block 53, thereby yielding the predicted excess specific kinetic energy $\Delta e_{K_{TDZ}}$ as set forth in Equation (9).

The predicted excess specific potential energy $\Delta e_{K_{TDZ}}$ is provided to an input of a summing junction 54 and the predicted excess specific kinetic energy $\Delta e_{K_{TDZ}}$ is provided to another input of the junction 54. The junction 54 adds together the predicted excess specific potential energy $\Delta e_{K_{TDZ}}$ and the predicted excess specific kinetic energy $\Delta e_{K_{TDZ}}$, thereby yielding the predicted excess specific total energy $\Delta e_{T,TDZ}$ as set forth in Equation (7). The predicted excess specific potential energy $\Delta e_{P_{TDZ}}$, the predicted excess specific kinetic energy $\Delta e_{K_{TDZ}}$, and the predicted excess specific total energy $\Delta e_{T,TDZ}$ are provided to comparators for comparison against predetermined thresholds for generation of alert messages as discussed further below.

Figure 3A:
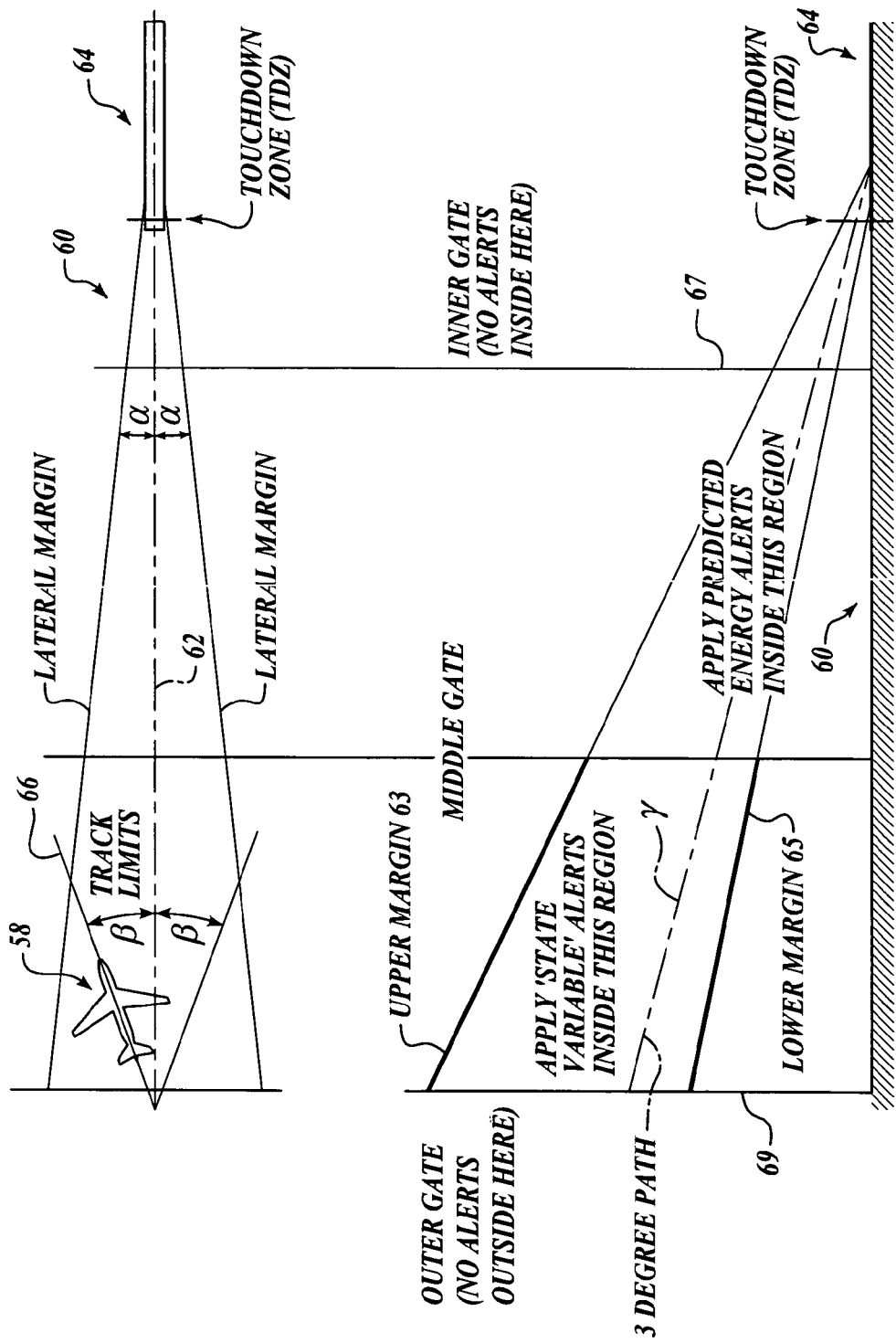
FIG. 3A illustrates enabling criteria.
Figure 3B:
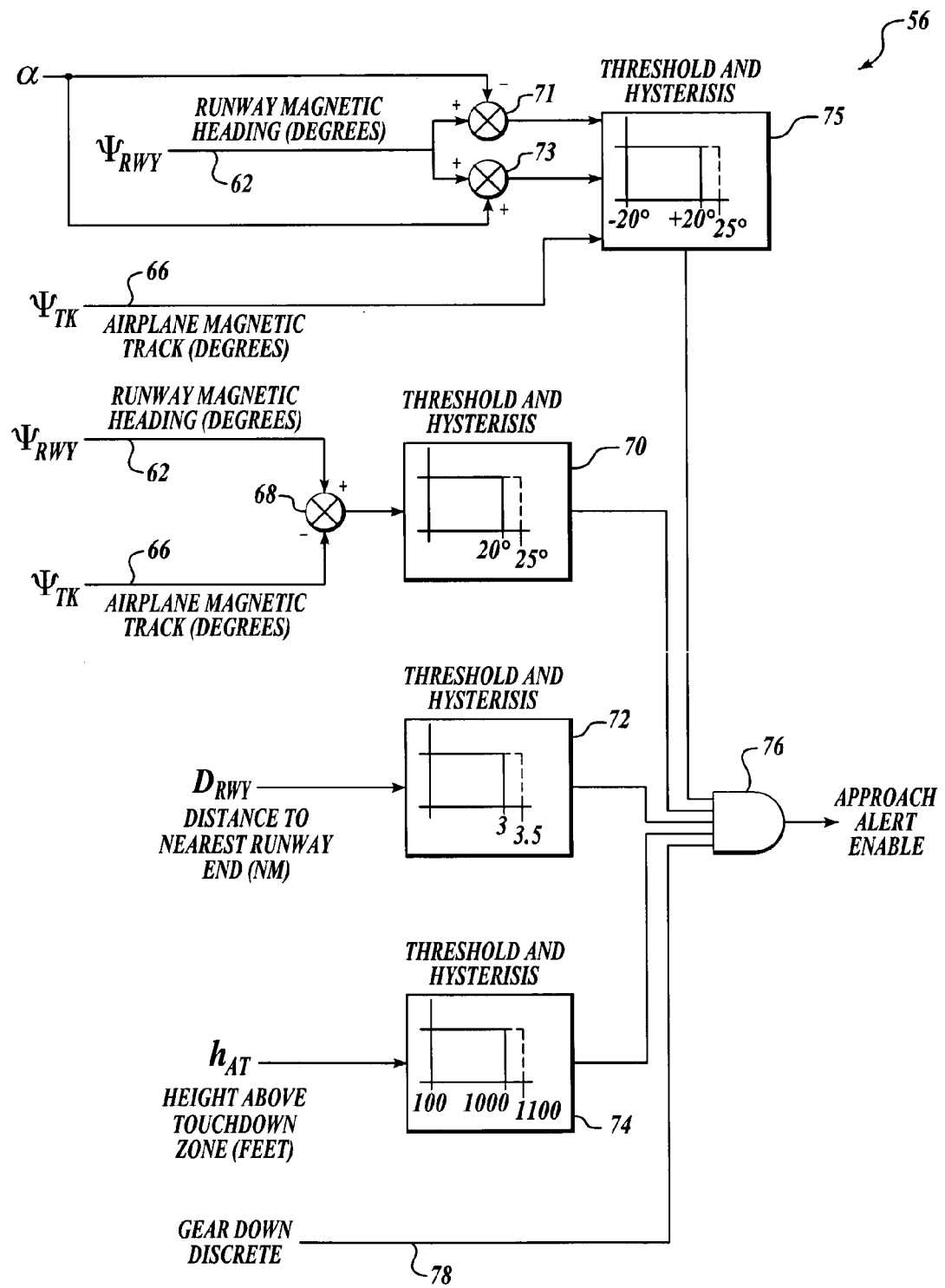
FIG. 3B is a logic diagram of exemplary enabling logic.

Referring now to FIGS. 3A and 3B, exemplary enabling logic 56 enables the system 10 (FIG. 1) to determine the predicted excess specific potential energy $\Delta e_{P_{TDZ}}$, the predicted excess specific kinetic energy $\Delta e_{K_{TDZ}}$, and the predicted excess specific total energy $\Delta e_{T,TDZ}$ during a landing approach. As will be discussed in detail below, the system 10 (FIG. 1) is enabled when an aircraft 58 is within predetermined lateral limits α of a runway 60, and within predetermined track limits β of a heading 62 of the runway 60, and between an upper margin 63 and a lower margin 65 of the flight angle γ, and between an inner gate 67 and an outer gate 69 from a beginning of a touchdown zone 64 of the runway 60, and when landing gear (not shown) is down.

In one present embodiment the lateral limits α suitably define margins beginning at the touchdown zone 64 and extending along the angle α from each side of centerline of the runway 60. In one present embodiment, given by way of nonlimitng example the angle α suitably may be around ten degrees or so. In another embodiment, the angle α suitably is around twenty degrees or so. However, it will be appreciated that the angle α may have any value as desired for a particular application.

In an exemplary embodiment, the angle α is provided to an inverting input of a summing junction 71 and provided to a non-inverting input of a summing junction 73. The heading 62 of the runway 60 is provided to a non-inverting input of the junction 71 and provided to a non-inverting input of the junction 73. This defines a range of values of ±α about the heading 62 of the runway 60 that are provided to a block 75. The heading 66 of the aircraft 58 is also provided to the block 75. The block 75 outputs a logic one when the heading 66 of the aircraft 58 initially becomes within the range of the heading 62 of the runway 60±α. Once initially activated, the block 75 applies a hysterisis and continues to output a logic one so long as the heading 66 of the aircraft 58 remains within a hysterisis limit. Given by way of nonlimiting example, the hysterisis limit for the block 75 suitably is around twenty-five degrees or so. However, it will be appreciated that the hysterisis limit for the block 75 may have any value as desired for a particular application.

In a present embodiment the track limits β suitably define an angle between the heading 62 of the runway 60 and a heading 66 of the aircraft 58. In one present embodiment, given by way of nonlimiting example the angle β suitably may be around twenty degrees or so. However, it will be appreciated that the angle β may have any value as desired for a particular application.

The heading 62 of the runway 60 is provided to an input of a summing junction 68 and the heading 66 of the aircraft 58 is provided to an inverting input of the junction 68. The junction 68 subtracts the heading 66 from the heading 62 and provides this difference to a block 70. The block 70 outputs a logic one when the difference initially becomes less than a threshold, such as the angle β. Once initially activated, the block 70 applies a hysterisis and continues to output a logic one so long as the difference from the junction 68 remains less than a hysterisis limit. Given by way of nonlimiting example, the hysterisis limit for the block 70 suitably is around twenty-five degrees or so. However, it will be appreciated that the hysterisis limit for the block 70 may have any value as desired for a particular application.

The outer gate 69 defines an outer limit from the touchdown zone 64 beyond which alerts are not generated. Similarly, the inner gate 67 defines an inner limit inside of which alerts are not generated. In one present embodiment, given by way of nonlimiting example the outer gate suitably is around four miles or so, but may have a value of around five miles, three miles, three-and-a-half miles, or any value as desired for a particular application. Given by way of nonlimiting example the inner gate 67 suitable is around one-half mile or so. However, it will be appreciated that the inner and outer gates 67 and 69 may have any values as desired for a particular application.

The distance to the touchdown zone $D_{TDZ}$ is provided to a block 72. The block 72 outputs a logic one when the distance to the touchdown zone $D_{TDZ}$ initially becomes less than a threshold distance, such as the outer gate 69. Once initially activated, the block 72 applies a hysterisis and continues to output a logic one so long as the distance to the touchdown zone $D_{TDZ}$ remains less than a hysterisis limit that is further out than the outer gate 69. It will be appreciated that the hysterisis limit for the block 70 may have any value as desired for a particular application. In addition, the block 72 outputs a logic one when the distance to the touchdown zone $D_{TDZ}$ is greater than the inner gate 67. When the distance to the touchdown zone $D_{TDZ}$ is less than the inner gate 67, the block 72 outputs a logic zero.

In one present embodiment the upper margin 63 and lower margin 65 envelop the flight angle γ. As is known, a typical value for the flight angle γ during a landing approach is around three degrees or so. Accordingly, and given by way of nonlimiting example, in a present embodiment the upper margin 63 may be around twelve degrees or so and the lower margin 65 may be around two degrees or so. However, it will be appreciated that the upper and lower margins 63 and 65 may have any values as desired for a particular application.

In one exemplary embodiment the height above touchdown $h_{AT}$ is provided to a block 74. The block 74 is a logic element which enables the processor 12 when the aircraft 58 is within the desired upper and lower margins 63 and 65, respectively. The block 74 includes an upper limit and a lower limit each with hysterisis that are variable as a function of distance to runway. Given by way of nonlimiting example, the upper limit may be around 1000 feet or so and the lower limit may be around 100 feet or so, and the hysterisis for the upper and lower limits may be around ten percent or so. However, it will be appreciated that the upper and lower limits and their hysterisis may have any value as desired for a particular application.

Outputs from the blocks 75, 70, 72, and 74 are provided to inputs of a logical AND gate 76. In addition, a discrete 78 that is indicative of gear down status is provided to an input of the AND gate 76. The discrete 78 is a logical one when the landing gear (not shown) is indicated down. When all of the outputs from the blocks 70, 72, 74, or TBD, or the discrete 78 is a logical one, the AND gate 76 outputs a logical one. When the AND gate 76 outputs a logical one, the processor 12 (FIG. 1) is enabled to predict specific energy as discussed above.

Figure 4:
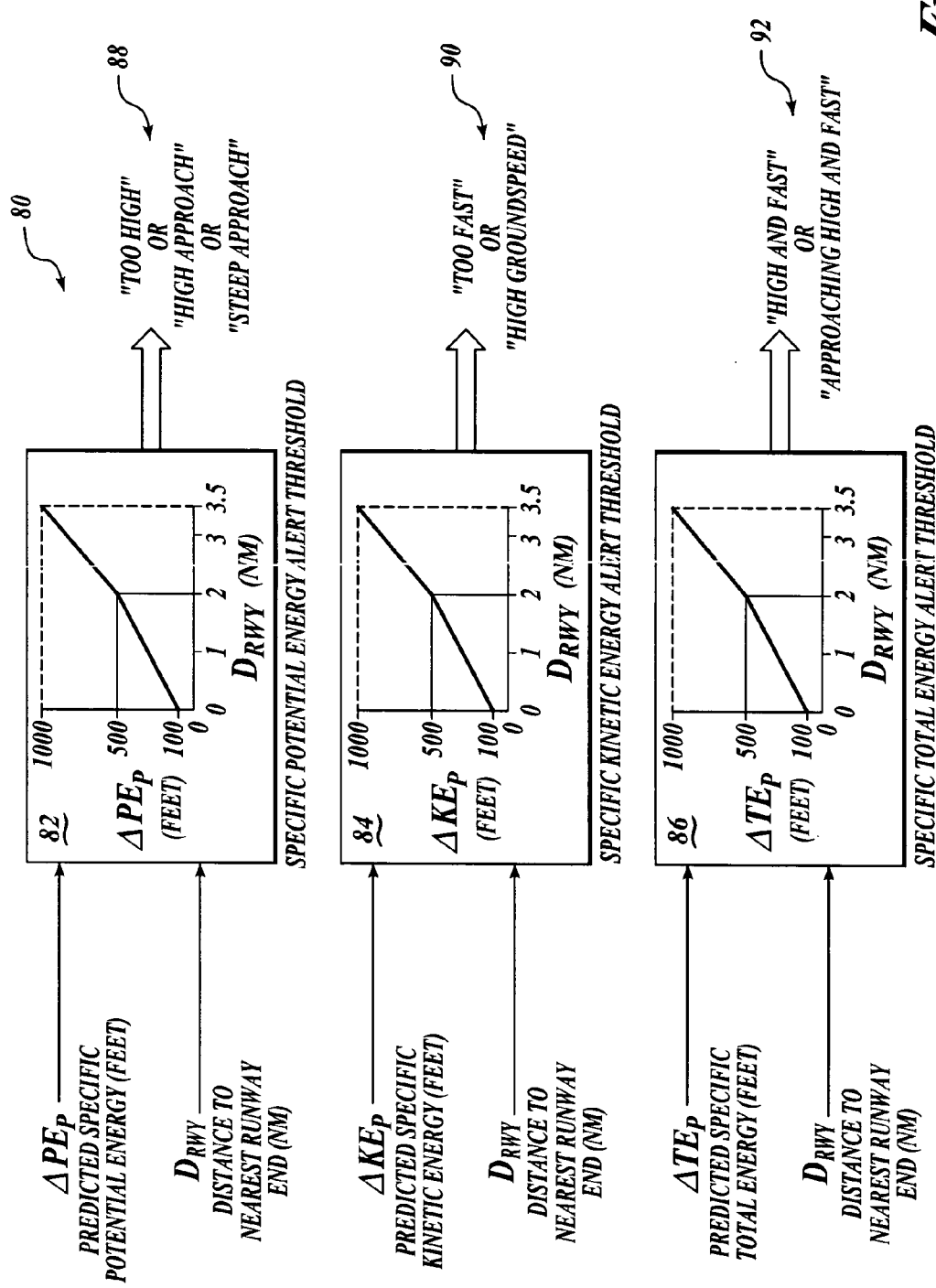
FIG. 4 is an illustration of exemplary alert thresholds.

Referring now to FIG. 4, comparison logic 80 compares the predicted excess specific potential energy $\Delta e_{P_{TDZ}}$ with a predetermined specific potential energy alert threshold 82, the predicted excess specific kinetic energy $\Delta e_{K_{TDZ}}$ with a predetermined specific kinetic energy alert threshold 84, and the predicted excess specific total energy $\Delta e_{T,TDZ}$ with a predetermined specific total energy alert threshold 86. As will be discussed below, when any of the specific energies is at least the value of its corresponding alert threshold, an appropriate alert is generated.

The alert thresholds 82, 84, and 86 each are provided with distance to nearest runway end. Each of the thresholds 82, 84, and 86 is substantially linearly proportional to the distance to nearest runway end. This is because, in general terms, an aircraft may be expected to be at a faster groundspeed and a higher height above touchdown zone when the aircraft is at a farther distance from the touchdown zone. Again generally, as the aircraft makes a landing approach, the aircraft is expected to have slower groundspeed and lower height above touchdown zone. As a result, the alert thresholds 82, 84, and 86 generally are lower at close distances to nearest runway end and become higher in a substantially linear manner as distance to nearest runway end increases. It will be appreciated that some maneuvering (and hence some change in predicted specific energy) is to be expected beyond approximately 2 miles from the touchdown zone. Accordingly, in an exemplary embodiment the alert thresholds 82, 84, and 86 suitably are expanded at a greater rate with increasing distance beyond that point.

When the predicted excess specific potential energy $\Delta e_{K_{TDZ}}$ is at least the value of the specific potential energy alert threshold 82 at the airplane's current distance to the nearest runway end, the alert message generator 22 (FIG. 1) generates an appropriate alert message 88 that is indicative of the airplane having an excessive height above the touchdown zone at the airplane's current distance from the nearest runway end. Given by way of nonlimiting example, the message 88 may indicate "too high" or "high approach" or "steep approach" or the like. However, it will be appreciated that any appropriate wording may be included as desired in the alert message 88. The alert message 88 may be displayed as a visual alert on the display device 11 (FIG. 1) and/or the aural alerting device 13 (FIG. 1) as desired.

When the predicted excess specific kinetic energy $\Delta e_{K_{TDZ}}$ is at least the value of the specific kinetic energy alert threshold 84 at the airplane's current distance to the nearest runway end, the alert message generator 22 (FIG. 1) generates an appropriate alert message 90 that is indicative of the airplane having an excessive groundspeed at the airplane's current distance from the nearest runway end. Given by way of nonlimiting example, the message 90 may indicate "too fast" or "high groundspeed" or the like. However, it will be appreciated that any appropriate wording may be included as desired in the alert message 90. The alert message 90 may be displayed as a visual alert on the display device 11 (FIG. 1) and/or the aural alerting device 13 (FIG. 1) as desired.

When the predicted excess specific total energy $\Delta e_{T,TDZ}$ is at least the value of the specific total energy alert threshold 86 at the airplane's current distance to the nearest runway end, the alert message generator 22 (FIG. 1) generates an appropriate alert message 92 that is indicative of the airplane having an excessive height above the touchdown zone and an excessive groundspeed at the airplane's current distance from the nearest runway end. Given by way of nonlimiting example, the message 92 may indicate "high and fast" or "approaching high and fast" or the like. However, it will be appreciated that any appropriate wording may be included as desired in the alert message 92. The alert message 92 may be displayed as a visual alert on the display device 11 (FIG. 1) and/or the aural alerting device 13 (FIG. 1) as desired.

Figure 5:
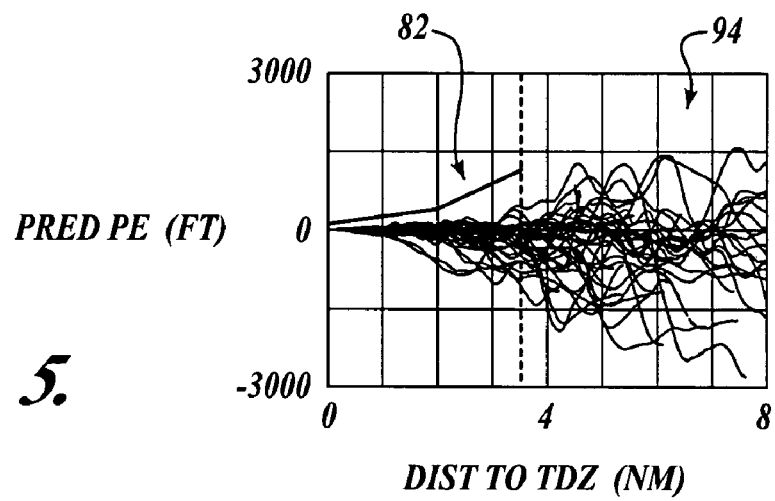
FIGS. 5–7 illustrate safety margins associated with the alert thresholds of FIG. 4.
Figure 6:
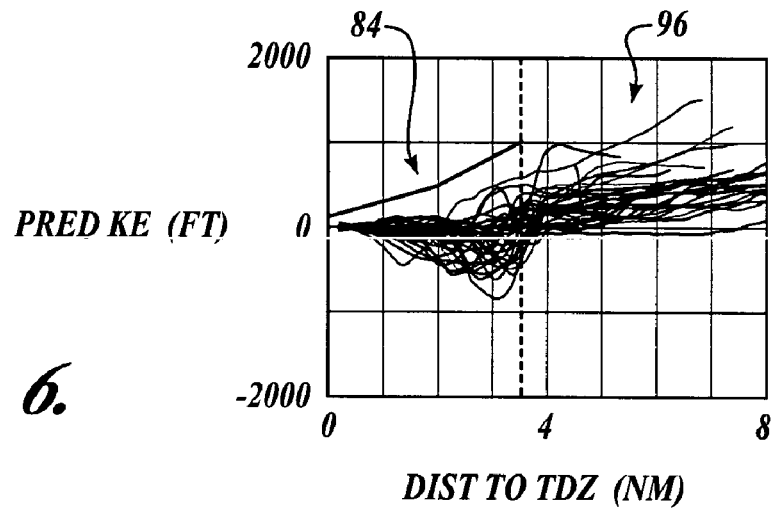
Figure 7:
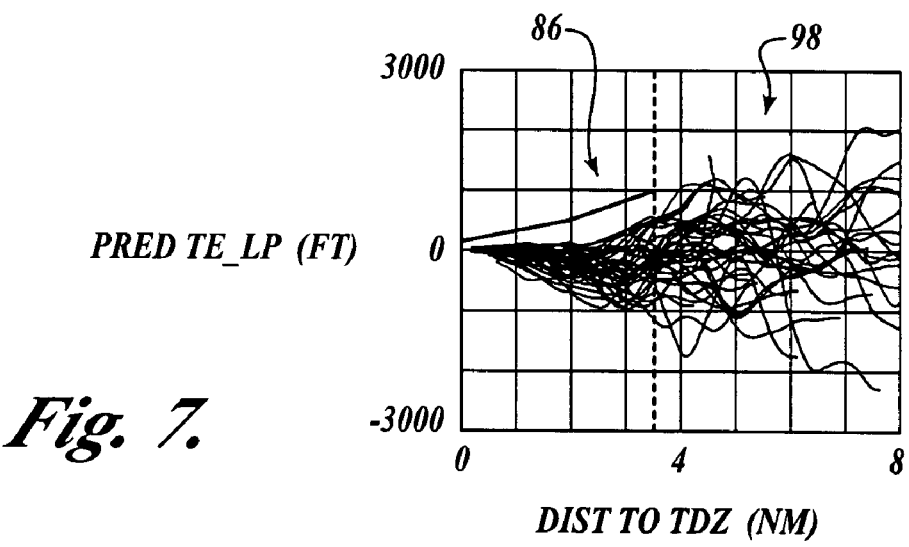

Referring now to FIGS. 5–7, the alert thresholds 82, 84, and 86 provide design safety margins to empirically-determined flight data for corresponding specific energies. Actual specific potential energy 94, actual specific kinetic energy 96, and actual specific energy 98 were empirically determined on a Beach King Air aircraft. Advantageously, the alert thresholds 82, 84, and 86 are all defined at values sufficiently in excess of their respective actual specific energies 94, 96, and 98 such that the alert thresholds 82, 84, and 86 all allow margins from stable approach criteria. As a result, increased visual and aural clutter in the flight deck is avoided.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A system for alerting a flight crew of an aircraft of a potentially hazardous condition, the system comprising:
   a processor configured to predict specific energy of an aircraft at a touchdown zone of a runway;
   a comparator configured to compare the predicted specific energy with predetermined threshold specific energy; and
   an alert generator configured to generate an alert when the predicted specific energy is at least the predetermined threshold specific energy.

2. The system of claim 1, wherein the specific energy includes at least one of specific potential energy, specific kinetic energy, and specific total energy.

3. The system of claim 1, wherein the predetermined threshold specific energy varies approximately proportionately with distance from the aircraft to the touchdown zone of the runway.

4. The system of claim 2, wherein the alert includes a message that is indicative of an aircraft altitude that is higher than a predetermined glide slope when the predicted specific potential energy is at least the predetermined threshold specific potential energy.

5. The system of claim 2, wherein the alert includes a message that is indicative of an aircraft speed that is faster than a predetermined ground speed when the predicted specific kinetic energy is at least the predetermined threshold specific kinetic energy.

6. The system of claim 2, wherein the alert includes a message that is indicative of an aircraft altitude that is higher than a predetermined glide slope and an aircraft speed that is faster than a predetermined ground speed when the predicted specific total energy is at least the predetermined threshold specific total energy.

7. The system of claim 1, wherein the alert includes an aural alert.

8. The system of claim 1, wherein the alert includes a visual alert.

9. The system of claim 1, wherein the processor is further configured to begin predicting the specific energy when the aircraft is at a predetermined distance from the touchdown zone of the runway.

10. The system of claim 9, wherein the predetermined distance is less than around five miles.

11. A method for alerting a flight crew of an aircraft of a potentially hazardous condition, the method comprising:
    predicting specific energy of an aircraft at a touchdown zone of a runway;
    comparing the predicted specific energy with predetermined threshold specific energy; and
    generating an alert when the predicted specific energy is at least the predetermined threshold specific energy.

12. The method of claim 11, wherein the specific energy includes at least one of specific potential energy, specific kinetic energy, and specific total energy.

13. The method of claim 11, wherein the predetermined threshold specific energy varies approximately proportionately with distance from the aircraft to the touchdown zone of the runway.

14. The method of claim 12, wherein generating the alert includes generating a message that is indicative of an aircraft altitude that is higher than a predetermined glide slope when the predicted specific potential energy is at least the predetermined threshold specific potential energy.

15. The method of claim 12, wherein generating the alert includes generating a message that is indicative of an aircraft speed that is faster than a predetermined ground speed when the predicted specific kinetic energy is at least the predetermined threshold specific kinetic energy.

16. The method of claim 12, wherein generating the alert includes generating a message that is indicative of an aircraft altitude that is higher than a predetermined glide slope and an aircraft speed that is faster than a predetermined ground speed when the predicted specific total energy is at least the predetermined threshold specific total energy.

17. The method of claim 11, wherein the alert includes an aural alert.

18. The method of claim 11, wherein the alert includes a visual alert.

19. The method of claim 11, wherein predicting the specific energy begins when the aircraft is at a predetermined distance from the touchdown zone of the runway.

20. The method of claim 19, wherein the predetermined distance is less than around five miles.

21. A computer program product for alerting a flight crew of an aircraft of a potentially hazardous condition, the computer program product comprising:
  first computer software program code means for predicting specific energy of an aircraft at a touchdown zone of a runway;
  second computer software program code means for comparing the predicted specific energy with predetermined threshold specific energy; and
  third computer software program code means for generating an alert when the predicted specific energy is at least the predetermined threshold specific energy.

22. The computer program product of claim 21, wherein the specific energy includes at least one of specific potential energy, specific kinetic energy, and specific total energy.

23. The computer program product of claim 21, wherein the predetermined threshold specific energy varies approximately proportionately with distance from the aircraft to the touchdown zone of the runway.

24. The computer program product of claim 22, wherein the third computer software program code means generates a message that is indicative of an aircraft altitude that is higher than a predetermined glide slope when the predicted specific potential energy is at least the predetermined threshold specific potential energy.

25. The computer program product of claim 22, wherein the third computer software program code means generates a message that is indicative of an aircraft speed that is faster than a predetermined ground speed when the predicted specific kinetic energy is at least the predetermined threshold specific kinetic energy.

26. The computer program product of claim 22, wherein the third computer software program code means generates a message that is indicative of an aircraft altitude that is higher than a predetermined glide slope and an aircraft speed that is faster than a predetermined ground speed when the predicted specific total energy is at least the predetermined threshold specific total energy.

27. The computer program product of claim 21, wherein the alert includes an aural alert.

28. The computer program product of claim 21, wherein the alert includes a visual alert.

29. The computer program product of claim 21, wherein the first computer software program code means begins predicting the specific energy when the aircraft is at a predetermined distance from the touchdown zone of the runway.

30. The computer program product of claim 29, wherein the predetermined distance is less than around five miles.

31. A system for alerting a flight crew of an aircraft of a potentially hazardous condition, the system comprising:
  a processor including:
    a first component configured to predict specific potential energy of an aircraft at a touchdown zone of a runway;
    a second component configured to predict specific kinetic energy of the aircraft at the touchdown zone of the runway; and
    a third component configured to predict specific total energy of the aircraft at the touchdown zone of the runway;
  a comparator configured to compare the predicted specific potential energy with predetermined threshold specific potential energy, the comparator being further configured to compare the predicted specific kinetic energy with predetermined threshold specific kinetic energy, the comparator being further configured to compare the predicted specific total energy with predetermined threshold specific total energy; and
  an alert generator configured to generate a first alert when the predicted specific potential energy is at least the predetermined threshold specific potential energy, the alert generator being further configured to generate a second alert when the predicted specific potential energy is at least the predetermined threshold specific kinetic energy, the alert generator being further configured to generate a third alert when the predicted specific total energy is at least the predetermined threshold specific total energy.

32. The system of claim 31, wherein the predetermined threshold specific potential energy and the predetermined threshold specific kinetic energy and the predetermined threshold specific total energy vary approximately proportionately with distance from the aircraft to the touchdown zone of the runway.

33. The system of claim 31, wherein the first alert includes a message that is indicative of an aircraft altitude that is higher than a predetermined glide slope when the predicted specific potential energy is at least the predetermined threshold specific potential energy.

34. The system of claim 31, wherein the second alert includes a message that is indicative of an aircraft speed that is faster than a predetermined ground speed when the predicted specific kinetic energy is at least the predetermined threshold specific kinetic energy.

35. The system of claim 31, wherein the third alert includes a message that is indicative of an aircraft altitude that is higher than a predetermined glide slope and an aircraft speed that is faster than a predetermined ground speed when the predicted specific total energy is at least the predetermined threshold specific total energy.

36. The system of claim 31, wherein the processor is configured to begin predicting the specific potential energy and the specific kinetic energy and the specific total energy when the aircraft is at a predetermined distance from the touchdown zone of the runway.

37. The system of claim 36, wherein the predetermined distance is less than around five miles.

38. The system of claim 31, wherein the first component is configured to predict the specific potential energy responsive to height of the aircraft above the touchdown zone.

39. The system of claim 31, wherein the second component is configured to predict the specific kinetic energy responsive to square of ground speed of the aircraft.

40. A method for alerting a flight crew of an aircraft of a potentially hazardous condition, the method comprising:
  predicting specific potential energy of an aircraft at a touchdown zone of a runway;
  predicting specific kinetic energy of the aircraft at the touchdown zone of the runway;
  predicting specific total energy of the aircraft at the touchdown zone of the runway;
  comparing the predicted specific potential energy with predetermined threshold specific potential energy;
  comparing the predicted specific kinetic energy with predetermined threshold specific kinetic energy;
  comparing the predicted specific total energy with predetermined threshold specific total energy;
  generating a first alert when the predicted specific potential energy is at least the predetermined threshold specific potential energy;
  generating a second alert when the predicted specific kinetic energy is at least the predetermined threshold specific kinetic energy; and generating a third alert when the predicted specific total energy is at least the predetermined threshold specific total energy.

41. The method of claim 40, wherein the predetermined threshold specific potential energy and the predetermined threshold specific kinetic energy and the predetermined threshold specific total energy vary approximately proportionately with distance from the aircraft to the touchdown zone of the runway.

42. The method of claim 40, wherein the first alert includes a message that is indicative of an aircraft altitude that is higher than a predetermined glide slope when the predicted specific potential energy is at least the predetermined threshold specific potential energy.

43. The method of claim 40, wherein the second alert includes a message that is indicative of an aircraft speed that is faster than a predetermined ground speed when the predicted specific kinetic energy is at least the predetermined threshold specific kinetic energy.

44. The method of claim 40, wherein the third alert includes a message that is indicative of an aircraft altitude that is higher than a predetermined glide slope and an aircraft speed that is faster than a predetermined ground speed when the predicted specific total energy is at least the predetermined threshold specific total energy.

45. The method of claim 40, wherein predicting the specific potential energy and predicting the specific kinetic energy and predicting the specific total energy begin when the aircraft is at a predetermined distance from the touchdown zone of the runway.

46. The method of claim 45, wherein the predetermined distance is less than around five miles.

47. The method of claim 40, wherein the specific potential energy is predicted responsive to height of the aircraft above the touchdown zone.

48. The method of claim 40, wherein the specific kinetic energy is predicted responsive to square of ground speed of the aircraft.

49. A computer program product for alerting a flight crew of an aircraft of a potentially hazardous condition, the computer program product comprising:
    first computer software program code means for predicting specific potential energy of an aircraft at a touchdown zone of a runway;
    second computer software program code means for predicting specific kinetic energy of the aircraft at the touchdown zone of the runway;
    third computer software program code means for predicting specific total energy of the aircraft at the touchdown zone of the runway;
    fourth computer software program code means for comparing the predicted specific potential energy with predetermined threshold specific potential energy;
    fifth computer software program code means for comparing the predicted specific kinetic energy with predetermined threshold specific kinetic energy;
    sixth computer software program code means for comparing the predicted specific total energy with predetermined threshold specific total energy;
    seventh computer software program code means for generating a first alert when the predicted specific potential energy is at least the predetermined threshold specific potential energy;
    eighth computer software program code means for generating a second alert when the predicted specific kinetic energy is at least the predetermined threshold specific kinetic energy; and
    ninth computer software program code means for generating a third alert when the predicted specific total energy is at least the predetermined threshold specific total energy.

50. The computer program product of claim 49, wherein the predetermined threshold specific potential energy and the predetermined threshold specific kinetic energy and the predetermined threshold specific total energy vary approximately proportionately with distance from the aircraft to the touchdown zone of the runway.

51. The computer program product of claim 49, wherein the first alert includes a message that is indicative of an aircraft altitude that is higher than a predetermined glide slope when the predicted specific potential energy is at least the predetermined threshold specific potential energy.

52. The computer program product of claim 49, wherein the second alert includes a message that is indicative of an aircraft speed that is faster than a predetermined ground speed when the predicted specific kinetic energy is at least the predetermined threshold specific kinetic energy.

53. The computer program product of claim 49, wherein the third alert includes a message that is indicative of an aircraft altitude that is higher than a predetermined glide slope and an aircraft speed that is faster than a predetermined ground speed when the predicted specific total energy is at least the predetermined threshold specific total energy.

54. The computer program product of claim 49, wherein the first, second, and third computer software program code means begin predicting when the aircraft is at a predetermined distance from the touchdown zone of the runway.

55. The computer program product of claim 54, wherein the predetermined distance is less than around five miles.

56. The computer program product of claim 49, wherein the first computer software program code means predicts the specific potential energy responsive to height of the aircraft above the touchdown zone.

57. The computer program product of claim 49, wherein the second computer software program code means predicts the specific kinetic energy responsive to square of ground speed of the aircraft.

* * * * *